Jan. 14, 1947.    R. H. NISBET    2,414,430
ELECTRICALLY CONTROLLED SERVO SYSTEM
Filed June 17, 1937

INVENTOR
ROBERT H. NISBET
BY
Herbert H. Thompson
HIS ATTORNEY

Patented Jan. 14, 1947

2,414,430

UNITED STATES PATENT OFFICE 2,414,430

ELECTRICALLY CONTROLLED SERVO SYSTEM

Robert Hayes Nisbet, Osterley, England, assignor to Sperry Gyroscope Company, Inc., Brooklyn, N. Y., a corporation of New York Application June 17, 1937, Serial No. 148,670
In Great Britain June 22, 1936

15 Claims. (Cl. 172—239)

This invention relates to systems in which it is required to control one physical quantity to be a predetermined function of another physical quantity. More particularly the invention is applicable to systems in which the dependent quantity is to be a linear function of, or proportional to, the independent or sending quantity, and it is especially applicable to those systems of this kind in which both quantities are angular displacements. Such systems include position control and follow-up systems in which a positioned or responding body has to be controlled so as to reproduce the motions of a sensitive or sending body. Hereinafter the invention is described with particular reference to such position control and follow-up systems.

The difficulties in position control systems arise particularly when very accurate following of the sending body by the dependent or responding body is required, and especially if the motion of the responding body is opposed by high frictional or inertia forces.

In position control systems, the motions to be followed and reproduced are usually angular motions, and it will be assumed that this is the case hereinafter. Let the angular position of the sending body from some zero be denoted by $\theta$, and the angular position of the responding body from the corresponding zero by $\phi$. Then the lag in following, or the amount by which the responding body is behind the sending body is $\theta - \phi$. Let this be denoted by $\psi$.

The object to be attained by a position control system is to make $\phi$ equal to $\theta$ at all times. A perfect system would therefore make $\psi=0$ at all times, and consequently make $\dot{\psi}=0$ and $\ddot{\psi}=0$ at all times. These last two equations express the condition that, whenever following is perfect, the responding body necessarily has the same velocity and acceleration as the sending body at all times, for they are equivalent to the equations $\dot{\phi}=\dot{\theta}$ and $\ddot{\phi}=\ddot{\theta}$.

The present control system differs from previous ones in that the condition for perfect following, viz. $\psi=0$, $\dot{\psi}=0$, $\ddot{\psi}=0$ is consistent with the control system. Previous systems as is shown hereinafter gave rise to equations of motion which could not be satisfied by the solution $\psi=0$ at all times; in other words the nature of the control system itself rendered perfect following impossible. One object of the present invention is to provide a control system which has $\psi=0$ as a particular solution of the equation of motion.

The fact that perfect following is consistent with the present system constitutes an advance over the prior art and it is the primary feature of this invention. However, this fact does not in itself ensure that perfect following will be obtained, i. e. that the motion will correspond to the equation $\psi=0$. It is true that the equation $\psi=0$ is a particular solution of the equations of motion for apparatus in accordance with my invention, but it is not the only solution, and the actual motion is not simply the motion corresponding to the most obvious particular solution. I therefore describe hereinafter further modifications of the control system whose object is to ensure that the actual solution shall approximate still more closely to the particular solution $\psi=0$ than would be the case in the simplest applications of the principles of the invention in their primary form. These modifications constitute a further feature of the invention.

In position control systems the usual method of positioning the responding body is by means of some device for supplying power to run the body in one direction or the other as required. Such devices are termed servo-motors: they may be electric or hydraulic motors or they may be variable speed or variable coupling members to drive the body from some continuously running shaft.

It is clear that the responding body and the moving parts of the servo-motor driving it, constitute a single system to which must be imparted motions that are known functions of the motions of the sending body.

In the more general control systems to which the present invention is applicable the same situation occurs. Some physical quantity has to be controlled to be a predetermined function of a sending quantity, and the controlled quantity must usually be set by regulating the motion of some member, power being required to produce the motion. A servo-motor is therefore called for, and this, together with the regulating member moved by it, constitutes a system to which motions must be imparted that are known functions of the sending quantity. Thus, in this respect a position control system is a typical example of the more general systems to which the invention is applicable.

In order to indicate more clearly wherein lie the improvements in the means adopted in the present invention over the prior art, it is necessar to review briefly the known methods of control employed in position control systems.

The methods of control may be classified by the principles of operation of the controllers used for the servo-motor. Clearly in any position control system it is necessary to have a controller for the servo-motor to determine what torque or speed is imparted to the responding body, or its regulator (or rather to the system constituted by the responding body and the moving parts of the servo motor or its regulator).

A well known form of controller for a servo motor is the chaser switch, or hunting switch, as it is sometimes called. This controller can only switch on full power to the servo-motor, to run it either in one direction or in the opposite. If the responding body lags more than a certain amount behind the sending body a contact is made and full power is switched on to run the responding body forward. If, however, due for example to overrunning of the position of alignment the responding body is more than a certain amount ahead of the sending body, full power is switched on to drive the responding body backwards.

In this system the servo-motor, when full power is applied to it, must be capable of driving the responding body at least as fast as the maximum speed of the sending body. Consequently if the sending body is moving at a constant velocity less than this maximum, the responding body cannot follow it. This is clear, because the controller is only able to switch on full power, which drives the responding body too fast. Perfect following is impossible because the controller is not graduated in its action to supply the graduated amount of power required to keep the responding body moving at the same constant velocity as the sending body.

Another and more elaborate form of control is that in which power is switched on to the servo motor in a graduated manner, the arrangement being such that the amount of power is regulated by the lag, so that the greater the lag, the greater is the amount of power switched on. Controllers of the potentiometer or Wheatstone bridge type come into this category. The operation of such controllers may be described as being in accordance with the leg $\psi$ (at least approximately or at least over a certain range), for the torque of the motor is at least roughly proportional to $\psi$ and changes sign with $\psi$.

With such systems it does then become possible, when the sending body has a constant velocity, for the responding body to follow it at the same constant velocity. But in order that this should happen a definite amount of power must be supplied to the servo motor to keep it and also the responding body running at the same constant speed as the sending body. The controller for the servo motor must be so set as to supply just this right amount of power, and, since the control is in accordance with $\psi$, the lag $\psi$ must be of just the right amount to set the controller to control this amount of power. The higher the speed of the sending body, the greater must be the power and therefore the greater the lag during steady following. Zero lag is impossible, because it would cause zero power to be supplied, in which case the servo motor would not run. This analysis justifies the statement already made that perfect following is inconsistent with the nature of the control system.

Still more elaborate forms of control for servo motors operate in acccordance not only with $\psi$ but with its differentials $\dot{\psi}$ and $\ddot{\psi}$. These forms have certain advantages but they do not in any way overcome the defect just discussed. If the responding body does really run at the same velocity as the sending body and if the latter has a constant velocity, then $\dot{\psi}$ and $\ddot{\psi}$ are both zero. In such a case $\psi$ cannot also be zero, for then all the quantities controlling the servo motor would be zero, so that no power would be supplied to it to run the responding body.

One of the objects of the present invention is so to control the servo motor that even when $\psi$, $\dot{\psi}$ and $\ddot{\psi}$ are all zero the motor is still furnished with the correct amount of power to provide the responding body with the same speed and acceleration as the sending body.

The simplest method of arriving at this result in accordance with the principles of the present invention is to provide means responsive to the speed and acceleration, $\dot{\theta}$ and $\ddot{\theta}$ of the sending body, and to use these means modified in accordance with the known characteristics of the responding body to control the servo motor, so that the servo-motor imparts to the responding body a velocity $\dot{\phi}$ equal to $\dot{\theta}$ and an acceleration $\ddot{\phi}$ equal to $\ddot{\theta}$. These means are additional to control means controlling in accordance with $\psi$ and perhaps with $\dot{\psi}$ and $\ddot{\psi}$ and higher differentials. In my invention as applied to such a position control system I control the servo motor in accordance with a function not merely of $\psi$ but of $\dot{\theta}$ and $\ddot{\theta}$ and perhaps $\dot{\psi}$, $\ddot{\psi}$, $\dddot{\psi}$ etc. and $\dddot{\theta}$, $\ddddot{\theta}$.

From another point of view, whereas older systems transmitted from the sending body only indications of the position towards which the responding body should move, the systems in accordance with the present invention also transmit the correct velocity and acceleration to take the responding body to this position, so that it can go there without lagging on the way.

In accordance with the more general principles of my invention I provide a control system for controlling a controlled physical quantity to be a pre-determined function of another given or measurable physical quantity (referred to as the sending quantity), said control system including means for controlling the rate of supply of power to means for setting the controlled quantity, the control system being characterised by the employment of control terms for controlling the rate of power supply which include not only a term representing the inaccuracy of the controlled quantity but also terms representing the first and/or higher derivatives with respect to time of the sending quantity.

According to another feature of the invention remote position-control and follow-up systems are provided in which the servo-motor is controlled by the lag in following together with the velocity and/or acceleration, with or without higher derivatives of the velocity, of the sending element.

According to another feature of the invention, electrical control means are provided for altering the effective damping of a system comprising a servo-motor together with members driven by it.

According to another feature of the invention, in an electro-mechanical system such as an electric motor with an electric control system therefor, means are provided for altering the effective mechanical constants of the mechanical system by electrical feed back from the mechanical system into the electric control system.

According to another feature means are provided for measuring the velocity and/or acceleration or other derivatives of the velocity of a sensitive indicator, such as a gyro compass, which is too sensitive to drive a tachometer directly, the means comprising a follow-up system for the indicator, means for measuring the velocity or derivatives thereof of the follow-up system, means for measuring the velocity or derivatives thereof of the indicator relative to the follow-up member, and means for combining these measurements to provide the required velocity or derivatives thereof.

According to another feature the angular velocity or derivatives thereof of an unstable platform such as a ship is measured relative to the sensitive element of a directional instrument by measuring its velocity or derivatives thereof relative to the follow-up system of said directional instrument, and combining these measurements with measurements of the velocity or derivatives thereof of the sensitive element relative to the follow-up element.

According to another feature of the invention there is provided a magnetic amplifying system using saturable reactors whereby a signal can be amplified with sense discrimination.

According to another feature of the invention means are provided, in a control system using an electric servo-motor, for compensating for the effect of the back E. M. F. of the servo-motor on the desired control characteristics of the system.

According to another feature of the invention means are provided, in a remote control system using "selsyns" and torque amplifiers, to compensate for the displacement of the axis of the magnetic flux in the "selsyns" due to the angular velocity of the "selsyns."

In order to make clear the nature of the invention consider, as before, a position control or follow-up system. Suppose that the responding body (together with the servo-motor) has an effective moment of inertia I and is subject only to idealised frictional forces proportional to the velocity, as in the case of viscous friction. (Such idealised frictional forces are commonly taken as first approximations to the actual frictional forces.) Since $\dot{\phi}$ and $\ddot{\phi}$ represent the angular velocity and acceleration of the responding body, the torque T acting to produce these is given by the equation $$T = I\ddot{\phi} + K\dot{\phi}$$

where K is a frictional or viscous coefficient. The actual motion can be found explicitly from this equation only when the applied torque T is known.

The simplest form of the principle of the present invention, as aplied to this case, consists in using means to provide physical measures of $\dot{\theta}$ and $\ddot{\theta}$, modifying these in accodance with the characteristics I, K of the responding body, combining them, and adding a term depending on $\psi$, so as to construct some physical quantity proportional to $$I\ddot{\theta} + K\dot{\theta} + S\psi$$

and then controlling the servo-motor by this quantity so that it applies a torque T given by this expression, i. e. so that $$T = I\ddot{\theta} + K\dot{\theta} + S\psi$$

The motion of the responding body can then be found by substituting this value of T in the equation of motion $$T = I\ddot{\phi} + K\dot{\phi}$$

The result is $$I\ddot{\theta} + K\dot{\theta} + S\psi = I\ddot{\phi} + K\dot{\phi}$$

and, since $$\theta - \phi = \psi$$

the equation becomes $$I\ddot{\psi} + K\dot{\psi} + S\psi = 0$$

It is clear that the solution corresponding to perfect following, viz. $\psi = 0$ (involving both $\ddot{\psi} = 0$, and $\dot{\psi} = 0$) is consistent with the equations of motion thus obtained for the present control system. In fact, the solution $\psi = 0$ is a particular integral of the equation of motion.

The general solution of an equation of motion, as is well known, consists of the particular integral combined with a complementary function representing either natural sustained oscillations of the system or transient terms that die out to zero after a time and leave the particular integral only. Since the particular integral is zero, the whole general solution therefore reduces to the complementary function and corresponds either to sustained oscillation or to the transient disturbance. This general solution is, of course, the error in following.

In theory the transient, in all practical cases, should not be a sustained oscillation, but a damped sinusoidal oscillation, because the damping coefficient is $$\frac{K}{2I}$$

which is positive. Even when this theoretical result holds good, the positive damping would in most cases turn out to be very low, since in servo systems the inertia is generally more important than the viscous friction, so that $$\frac{K}{I}$$

is small. Moreover the natural frequency, which is approximately $$\frac{1}{2\pi}\sqrt{\frac{S}{I}}$$

is usually fairly low. For both these reasons, the transient error is of some importance. Moreover, the control system is never instantaneous in its action, and the time lag resulting from this cause can be shown to introduce negative damping. The negative damping may be so great that the total damping may be zero and the system as a whole may break into sustained oscillations or "hunt," in contradiction to the "theoretical" result that the complementary function is always a damped oscillation.

Whether the system hunts or the damped oscillation is of low damping and frequency, the transient error in following is important. It is therefore preferable not to use the primary form of the invention in which the control of the servo motor is in accordance with $\theta$, $\dot{\theta}$ and $\psi$, but rather the modified or second form in which the control is in accordance with $\theta$, $\dot{\theta}$, $\psi$, $\dot{\psi}$, and $\ddot{\psi}$, and perhaps higher differentials. In other words, I use a control for the servo motor causing it to supply a torque T given by the formula $$T = I\ddot{\theta} + K\dot{\theta} + S\psi - I'\ddot{\psi} + K'\dot{\psi}$$

where I' and K' are constants which may be arbitrarily chosen to give the best results. The motion of the responding body is then given by the equation $$I\ddot{\phi} + K\dot{\phi} = I\ddot{\theta} + K\dot{\theta} - I'\ddot{\psi} + K'\dot{\psi} + S\psi$$

In virtue of the equation $\theta - \phi = \psi$, this reduces to $$(I - I')\ddot{\psi} + (K + K')\dot{\psi} + S\psi = 0$$

As before, this has, as a particular integral, the solution $\psi = 0$, so that perfect following is consistent with the equations of motion not only with the primary form of the invention, but also with the secondary form. The transient errors, however, are now different and are characteristic of a system with the lower inertia I—I' instead of I, and with the increased viscous friction coefficient $K+K'$ instead of $K$. Consequently the transient errors are of much higher frequency and of much greater damping and both frequency and damping are adjustable at will, independently of the responding body and of the servomotor. In this way the effective mechanical constants of the system comprising the servomotor and the parts driven by it are altered by purely electrical means, viz. the introduction of appropriate control terms into the control system of the electro-mechanical system constituted by the said mechanical system and the electrical system controlling it.

Not only may all tendency to hunt be completely eliminated by the methods just described which act by converting negative damping to a high positive damping, but the transient may be so highly damped as to become aperiodic. It will, of course, be appreciated that more power may be required to produce the nearly perfect following with fast highly damped transients that results from this system of control. It is assumed here that the power is available so that the present invention is concerned only with the principles on which the power should be controlled.

Before proceeding to describe some actual systems operating in accordance with the principles of the invention, it is convenient to refer to a special principle that I use in some cases which greatly increases the number of possible methods of carrying the general principle into effect, and which, in particular, makes it applicable to cases where it could not otherwise be employed.

According to the principle of the present invention it is necessary to find means responsive to $\dot{\theta}$ and $\ddot{\theta}$ which will exert some physical effects proportional to $\dot{\theta}$ and $\ddot{\theta}$ suitable for controlling the servo motor. A convenient method described hereinafter is to attach a tachometer generator to be driven by gearing from the sending body. The voltage of this generator is a measure of $\dot{\theta}$ and the rate of change of this voltage can be derived as a voltage across an impedance in a suitable circuit; this voltage is therefore a measure of $\ddot{\theta}$. In fact voltages representing any desired combination of $\dot{\theta}$ and $\ddot{\theta}$ can be obtained by known methods. However, in many cases where a position control or follow-up system is to be used, the sending body is a sensitive or indicating body such as a gyro compass, which, would be disturbed and rendered erroneous if a tachometer generator were geared to it. In such cases it becomes impracticable to derive $\dot{\theta}$ and $\ddot{\theta}$ in any direct manner. Means are, however, known for deriving $\psi$, $\dot{\psi}$ and $\ddot{\psi}$ without disturbing the sensitive sending body, and there are already in existence and fully described, methods of control for servo-motors that employ these terms as control quantities.

Accordingly a special principle that I may employ when adapting the principle of the invention to sensitive sending bodies is to make use of the equation $$\theta - \phi = \psi$$

in the form $$\theta = \phi + \psi$$

The general control quantity that I prefer to use viz.:

$$T = I\ddot{\theta} + K\dot{\theta} + S\psi - I'\ddot{\psi} + K'\dot{\psi}$$

then becomes $$T = (I-I')\ddot{\psi} + (K+K')\dot{\psi} + S\psi + I\ddot{\phi} + K\dot{\phi}$$

Since control terms in $\psi$, $\dot{\psi}$ and $\ddot{\psi}$ are used in known types of control system, I can apply the principle by combining with the known means of using these control terms further means for combining with them other terms ($\dot{\phi}$ $\ddot{\phi}$) derived from a tachometer generator or other means responsive to velocity and/or acceleration of the responding body alone. In this way I am able to build up terms in $\dot{\theta}$, $\ddot{\theta}$, instead of deriving them directly from the sending body.

Conversely I can apply this same special principle in the form $$\psi = \theta - \phi$$

to convert the control quantity into the form $$(I-I')\ddot{\theta} + (K+K')\dot{\theta} + I'\ddot{\phi} - K'\dot{\phi} + S\psi$$

or into $$(I-I')\ddot{\theta} + (K+K')\dot{\theta} + S\theta + I'\ddot{\phi} - K'\dot{\phi} - S\phi$$

and I can derive the terms in $\ddot{\theta}$ and $\dot{\theta}$ from a tachometer generator or the like at the sending body and the terms in $\ddot{\phi}$ and $\dot{\phi}$ from a tachometer generator or the like at the responding body, the term $\psi$ being obtained in well known manner. This method may have advantages for cases in which the sending body is not particularly sensitive to disturbance, since, when it is used, the equipment for obtaining the velocity and acceleration terms may be the same at both ends and may be standardized, while the complications involved in obtaining the derivative terms $\dot{\psi}$ and $\ddot{\psi}$ may be avoided.

I now describe the invention as applied in some particular forms of follow-up system.

Figures 1, 1A:
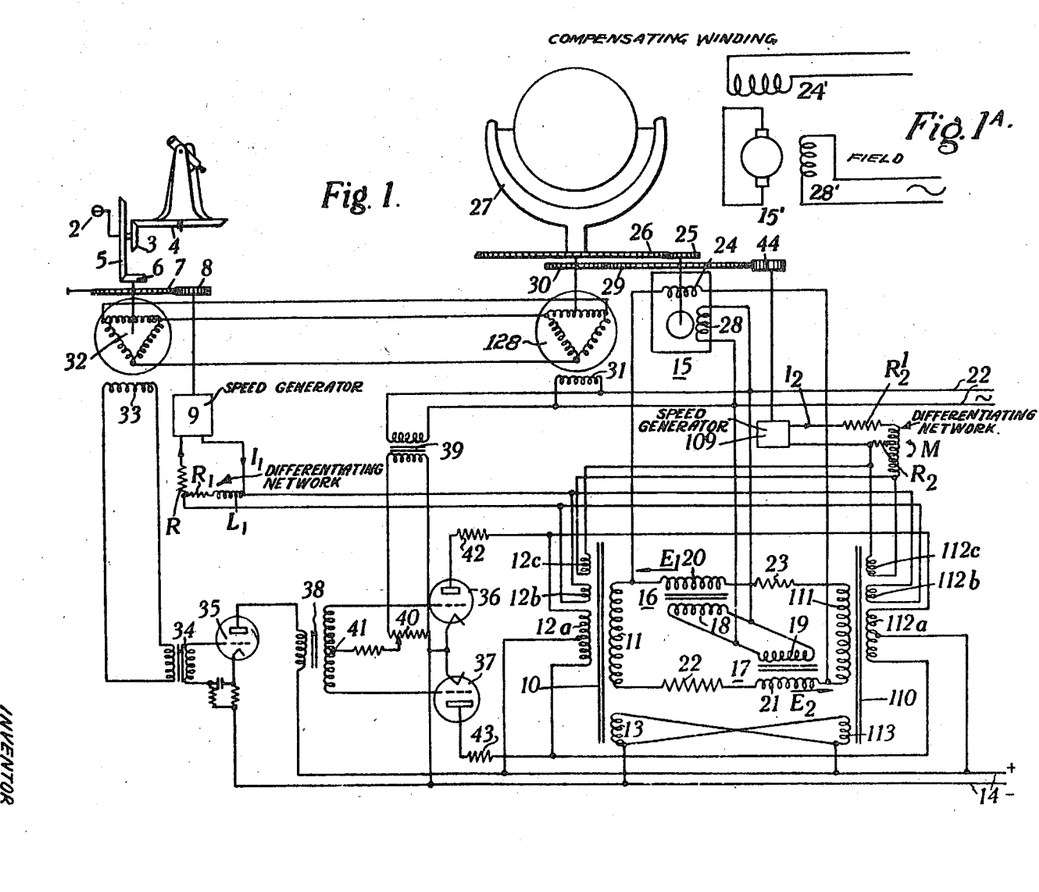
Fig. 1 is a diagram of a control system for controlling the movements of searchlights in azimuth in accordance with the movements of a sight. A magnetic amplifying system using saturable reactors is employed.
Fig. 1A is a diagrammatic circuit of one type of motor suitable for rotating the searchlight.

In Figure 1, the sight is trained round by manual operation of a handle 2 geared to it by bevel gearing 3, 4, and there is also geared to the handle by gearing 5, 6, 7, 8 to run at a still higher speed a tachometer generator 9 generating an E. M. F. proportional to the angular velocity $\dot{\theta}$ of the sight in azimuth. The generator 9 works into a load circuit R, L₁, R₁, of high resistance so that the resistive voltage drop is very much greater than any inductive voltage in the circuit due to rates of change of the current I. This fact ensures that the current output I, of the generator is almost exactly proportional to the generated E. M. F., and is therefore a measure of the speed $\dot{\theta}$.

The load circuit of the generator 9 thus includes inductance L; the voltage across the latter and across the portion $R_1$ of the load resistance is used for control purposes. This voltage is therefore $$R_1 I_1 + L_1 \frac{dI_1}{dt}$$

and since $I_1$ is proportional to $\dot{\theta}$, the voltage is proportional to $$R_1 \dot{\theta} + L_1 \ddot{\theta}$$

The output voltage so obtained is to be used as a term in the control of a servo-motor to position a searchlight. A system of power amplification is required. In the system shown in Fig. 1 saturable reactors are used as amplifiers, in a novel circuit arrangement whereby amplification with sense discrimination is obtained.

Figures 2, 3:
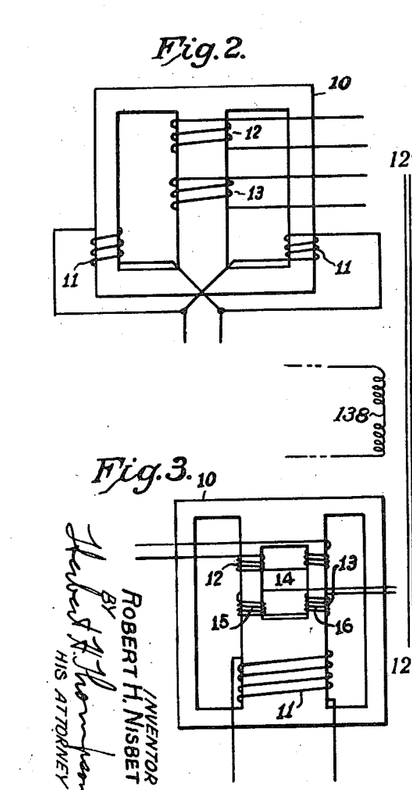
Fig. 2 is a diagram illustrating one kind of saturable reactor that may be employed in the system of Fig. 1.
Fig. 3 is a diagram illustrating another kind of saturable reactor that may be employed in the system of Fig. 1.

Figs. 2 and 3 show well known forms of saturable reactors that may be used in this novel amplifier.

In Fig. 2 the saturable reactor 10 is of the three-legged type. The alternating current winding or impedance winding 11 is wound with two equal coils in parallel, each disposed on one of the outer legs in such manner as to send flux up one of the legs and down the other, which produces no tendency to send flux down the centre leg. The saturating windings are disposed on the centre leg so as to send flux up the centre leg and down the outer legs, or vice versa. Two saturating windings 12, 13 are shown, of which 12 may be called the operating winding and 13 the biasing winding. However, more than one operating winding may be used, in which case I denote the operating windings by the reference numerals 12a, 12b, 12c etc.

In Fig. 3 the core 10 of the saturable reactor is of the well-known type having a centre leg with a window 14 cut out of it, leaving two narrow legs 15, 16 on each side. The alternating current or impedance winding 11 is wound round the centre leg and the saturating windings 12, 13 are wound round the narrow legs on each side of the window.

In Fig. 2 the flux due to the saturating currents can saturate the outer legs and thereby alter the impedance of the impedance winding 11. In Fig. 3 the flux due to the saturating winding passes up the leg 15 and down the leg 16 or vice versa, thus saturating one or other or both, so that here also the impedance of the impedance winding 11 is altered.

In Fig. 1 two of these saturable core reactors are shown, 10, and 110. The reference numbers for the windings correspond to those of Figs. 2 and 3 or to those numbers with the addition of 100. As shown, the biasing windings 13 are supplied with a constant direct current from D. C. mains. This current should be sufficient to produce saturation effects but not complete saturation. It should, in fact, bias the reactor to somewhere in the vicinity of the mid-points of the saturation characteristic. Under these conditions the reactor is very sensitive to a change in the magnetising ampere turns, such as is produced, for example, by current in the operating windings 12a, 12b or 12c, or in 112a, 112b, 112c on the second reactor. Each reactor, in virtue of its biasing ampere turns, distinguishes the sense of the additional ampere turns of the operating winding, and increases or decreases the impedance of the impedance winding according to the direction of the operating current. Corresponding windings 12a, 112a; 12b, 112b; 12c, 112c are connected in parallel so as to be supplied with the same current. The windings are so disposed and connected that, when the ampere turns of 12a, 12b, 12c are additive to those of winding 13, the ampere turns of 112a, 112b, 112c subtract from those of 113.

It follows that any ampere turns supplied to the operating windings increases the impedance of winding 11 and reduces that of winding 111 or does the reverse. The system of two reactors is such that their impedances are balanced and an input upsets the balance in one direction or the other according to the sense of the input.

The unbalance of the two reactors controls a servo motor as follows: Two transformers 16, 17 have their primary winding 18, 19 supplied from a source of A. C. 22. Their secondary windings 20, 21 producing equal E. M. F.'s $E_1$, $E_2$ are connected in series with the impedance windings 11, 111, of the reactors 10, 110 so as to drive a circulating current in the order 20, 11, 21, 111. Fixed resistance 22, 23 or other balanced impedances such as condensers may also be included in the circuit. A winding 24 of motor 15 is connected diametrically across the circuit 20, 11, 22, 21, 111, 23. There are therefore two E. M. F.'s capable of driving current through winding 24. The E. M. F. $E_1$, due to secondary winding 20 tends to drive current through winding 24 from left to right, then through winding 111 and impedance 23 back to the winding 20. The E. M. F. $E_2$ due to secondary winding 21 tends to drive current through winding 24 from right to left, then through winding 11 and impedance 22 back to winding 21. Normally the two reactors are balanced so that the two currents through winding 24 in opposite directions are equal, i. e. so that there is no current in winding 24. When the balance of the reactors is upset there will be a preponderance of current in one direction or the other through winding 24.

Owing to the symmetry of the balanced bridge 20, 11, 22, 21 111, 23 the current in 24 will be a symmetrical function of the operating ampere turns. In other words the control characteristic will have a point of inflexion at the origin. The motor current will therefore be a linear function of the operating current provided this is not too large. This is true irrespective of the nature of the impedances 22, 23. I may therefore choose these to be condensers of capacity such that the variation of impedance 11 in one sense or the other tends to produce resonance with the condenser 22. In this way the unbalance of the bridge is increased for a given operating current. The motor 15 has another winding 28 permanently supplied with alternating current from source 22. According, therefore, to the direction of the current in winding 24, so does the motor tend to run in one direction or the other applying a torque (neglecting back E. M. F.) approximately proportional to the operating current. Motor 24 drives through gearing 25, 26 the searchlight 27.

To the windings 12b and 112b is applied the control voltage $$R_1 I_1 + L_1 \frac{dI_1}{dt}$$

already referred to. It follows that the torque applied to the following system constituted by motor 15, searchlight 27, and associated moving elements is proportional to $$R_1 \dot{\theta} + L_1 \ddot{\theta}$$

It follows therefore that whenever the sight is turning at a constant velocity, a constant torque is applied to the searchlight, so that it is driven at a constant speed. If the constants of the system are properly proportioned, the speed of the searchlight will be equal to that of the sight. This condition can only hold good strictly if the torque/speed characteristic of the following system is linear. In any case a straight line approximating to this characteristic may be found and the constants of the system evaluated or adjusted as if this straight line were the actual characteristic.

Similarly, if the sight has an acceleration as well as a velocity, an additional E. M. F. will be applied to windings 12b, 112b and consequently an additional torque to motor 15 and searchlight 27. This additional torque, being greater than that required to keep the searchlight moving at a velocity equal to the instantaneous velocity of the sight will accelerate the searchlight. If the constants are properly chosen the acceleration of the searchlight will be equal to that of the sight.

A strict application of the principles of the invention when the torque speed characteristic of the following system is not linear would require that the current into winding 12b should be the same non-linear function of the speed of the sight. In particular cases this result may be achieved by using non-linear resistances for R or R₁.

In the above systems the velocities and accelerations of the sending and following members are always matched; the angular positions of the sight and searchlight should therefore remain matched without further control elements, but in fact matching cannot be obtained with the necessary accuracy and the angular positions of sight and searchlight would drift apart.

It is therefore necessary to provide an additional control to prevent such tendencies to drift apart. I therefore drive a "selsyn" transmitter 128 through suitable gearing 29, 30 from searchlight 27 or motor 15. This "seslyn" has its field winding 31 energised from alternating current mains 22. This "selsyn" transmits by lines to the "voltage" "selsyn" or variable transformer 32. The voltage output from the field winding 33 is therefore a measure of the error in following $\theta - \phi$ or $\psi$ where $\theta$ is the angular rotation of the sight and $\phi$ is that of the searchlight.

This voltage is applied through transformer 34 between the grid and cathode of an amplifying valve 35, which applies an amplified version of this voltage to a balanced rectifier or similar "phase detector."

As shown this consists of two amplifying valves 36, 37 whose anodes are supplied from the direct current mains 14 through windings 12a, 112a. The grids are fed in push-pull from the output of valve 35 by means of transformer 38, and they are also fed in parallel from the alternating current source 22 via transformer 39 potentiometer 40 and the centre tap 41 of the secondary winding of transformer 38. The valves 36, 37 are arranged as rectifiers: consequently an input from transformer 38 unbalances them and causes 36 or 37 to pass more rectified current than the other, the direction of the unbalance depending on the phase relationship of the push-pull voltage to the parallel voltage.

The consequence is that the normally balanced ampere turns in the two halves of winding 12a become unbalanced, as likewise do those of 112a, so that these two windings contribute ampere turns to control the impedance of windings 11, 111. The number of ampere turns contributed is proportional to the voltage output from winding 33, i. e. to $\psi$, if the anode circuits of valves 36, 37 are mainly of resistive impedance. In order to achieve this result I may use high resistances 42, 43 in the anode circuits, but I prefer to ensure high impedance by using high impedance valves, such as screen-grid valves or pentodes as the valves 36, 37.

Owing to the fact that the control characteristic for the system is linear or nearly so, and that the ampere turns of the operating windings are the sum of those of the two windings separately, the total torque applied to the following system is $$R_1\dot{\theta} + L_1\ddot{\theta} + S\psi$$

In order to introduce damping turns into the control in accordance with the secondary form of my invention, I provide a tachometer generator 109 driven from the motor 15 through gearing 29, 44.

The output circuit of this generator includes resistances $R_2$, $R_2^1$ and the primary winding of an auto transformer of mutual inductance M, the resistance $R_2 + R_2^1$ being so high compared with the inductance of the primary winding of the auto-transformer that the current $I_2$ may be considered to be determined by resistance only so that it is proportional to the speed $\dot{\phi}$ of the following member.

Windings 12c, 112c, in parallel are connected to the lead circuit of generator 109 so as to include the voltage across $R_2$ and the induced E. M. F. in the secondary winding of the auto-transformer.

In order to produce artificial cancellation of inertia I arrange that the mutual inductance M between the primary and secondary windings of the auto-transformer is negative, and to make this clear I put $M = -L_2$ where $L_2$ is positive. The voltage applied to the windings 12c, 112c is therefore $$R_2 I_2 - L_2 \frac{dI_2}{dt}$$

which is proportional to $R_2\dot{\phi} - L_2\ddot{\phi}$

The windings 12c, 112c are made predominantly resistive so that the ampere turns of the windings are also proportional to $R_2\dot{\phi} - L_2\ddot{\phi}$. The connections to the windings 12c, 112c are so made that these ampere turns subtract from those of windings 12b, 112b. The alternating current in winding 24 of motor 15 is therefore approximately proportional to $$R_1\dot{\theta} + L_1\ddot{\theta} - R_2\dot{\phi} + L_2\ddot{\phi} + S\psi$$

When this expression is negative the amplitude of the alternating current becomes negative, or, in other words, its phase changes by 180°.

This system is intended for motors in which a phase reversal of the current in the winding controlled from the reactors will reverse the direction of rotation. Motors that can be used with this system include two-phase induction motors as illustrated by motor 15 in Fig. 1, one phase of which is constantly excited from the alternating current supply, and single phase motors with field windings and compensating windings at right angles, such as the Atkinson motor. These can be used with constant excitation for the fields, the compensating windings being supplied from the reactors. Such a motor, 15', is shown in Fig. 1A in which compensating winding 24' is connected in circuit as is winding 24 of motor 15 and field winding 28' is connected to the A. C. supply.

The current supplied to the controlled winding of the servo motor in this system is proportional as a first approximation to $$R_1\dot{\theta}+L_1\ddot{\theta}-R_2\dot{\phi}+L_2\ddot{\phi}+S\psi$$

If the effective inertia and viscous or damping co-efficients of the secondary or controlled body, measured on the armature shaft of the servo motor are I and K respectively, then, in accordance with the principles of the invention the torque of the motor should be $$(I-I')\ddot{\theta}+(K+K')\dot{\theta}-K'\dot{\phi}+I'\ddot{\phi}+S\psi$$

Clearly this result can be obtained by proper proportioning of the constants, $R_1$, $L_1$, $R_2$, $L_2$, S, of the control system.

For a more accurate system it may be necessary to take account of some errors in certain assumptions that have been made. In particular it has been assumed that the angularly variable transformers measure the angle $\psi$ in all circumstances. This is not quite correct as there are errors when the transformers are rotating. In fact the indications, instead of being $s\psi$ also depend on $\dot{\theta}$ and $\dot{\phi}$. I may therefore modify the value of $R_1$ and $R_2$ which the "approximate" theory would indicate as correct, so as to allow for the speed "errors" of the Selsyns.

In addition to this, the motor itself generates a "speed" E. M. F. when it is rotating so that the current falls off at speed and is not proportional to the control quantity. I may therefore compensate for this back E. M. F. by providing an additional control term depending on this E. M. F. However, it is sufficiently accurate in most cases to provide an additional control term depending on the speed of the motor. This is easily effected by making the control term $-R_2\dot{\phi}$ smaller than would be indicated by an approximate theory that did not allow for the speed E. M. F.

In practice it is most convenient when setting up a system in accordance with the invention, to adjust the values of the constants by trial.

The above system uses saturated reactors as power amplifiers for controlling the servo motor in accordance with the control quantities generated in the control system. The invention is equally applicable to other systems of power amplification such as the Ward Leonard and related systems in which the fields of generators are controlled according to the desired control quantities, and the generators generate electrical power in accordance.

For control systems in which great accuracy is required I prefer to use means of amplification in which there is no question of time lags in setting up magnetic fields in masses of iron, and for this reason I will now describe an application of the invention to a control system using gas discharge tubes as amplifiers, and employed in a follow-up system for a gyro compass.

In this system the follow-up system is generally similar to those shown in Figure 1 of the specification of the copending patent application now Patent No. 2,233,415 to H. L. Hull, dated March 4, 1941, where an amplifier is shown with an output depending on $\psi$ and $\dot{\psi}$. Modifications in this amplifier are, however, made as in said Hull patent so that the amplifier output involves terms in $\psi$, $\dot{\psi}$, $\ddot{\psi}$; also further control terms are introduced.

Figure 4:
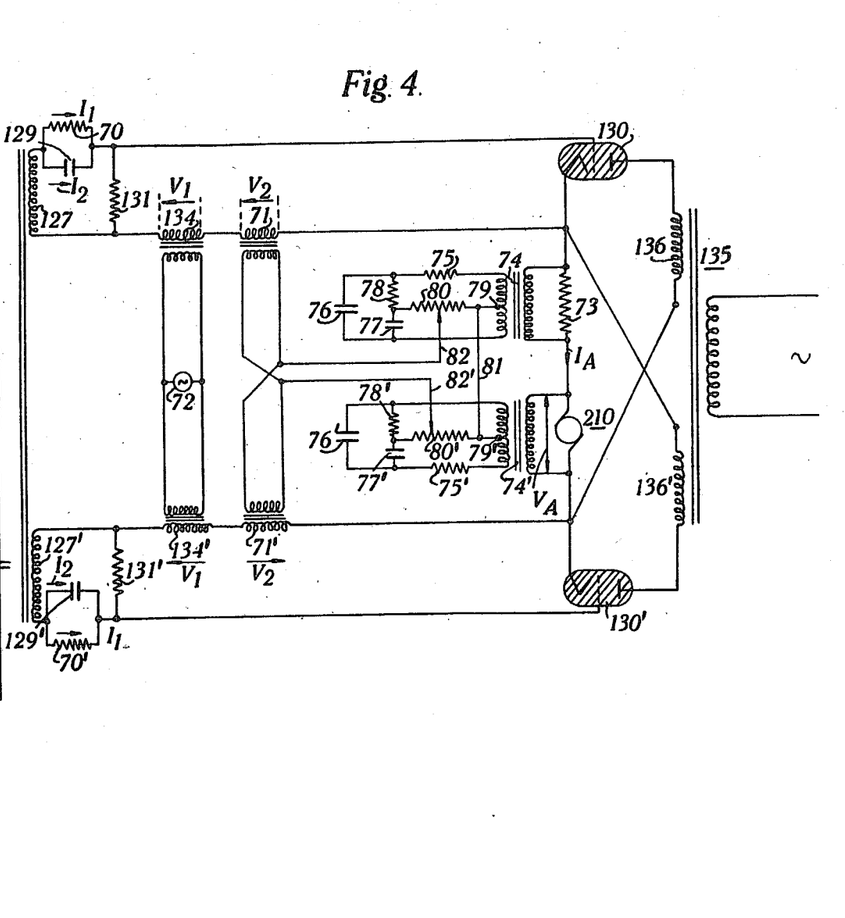
Fig. 4 is a schematic diagram of part of a control circuit for a position-control system using gas discharge tubes to control the servo-motor, illustrating some particular methods of obtaining control terms in accordance with my invention.

Fig. 4 shows the features distinguishing the present control system from that of Fig. 1 of U. S. Patent No. 2,139,558, Dec. 6, 1938, Francis L. Moseley, William T. Cooke and Carl A. Frische, inventors. Reference numerals in the two figures correspond with the difference of 100 or 200 except that input transformer 126 of the amplifier is shown connected to a winding 33' corresponding in function to winding 33 of the present Fig. 1 in that it is adapted to have induced in it a signal E. M. F. proportional to the lag in following of the controlled object. The condensers 129, 129' pass currents $I_2$ proportional to the second derivative $\ddot{\psi}$ of the lag $\psi$ as explained in the patent, No. 2,139,558 to Moseley, Cooke and Frische. In addition, the resistances 70, 70' pass currents proportional to the first derivative $\dot{\psi}$ as explained in said Hull patent. The total current passed into resistances 131, 131' and therefore the voltages produced across these resistances is therefore of the form $G\dot{\psi}+C\ddot{\psi}$ as explained in said Hull patent. In addition to these direct current voltages there is present across 131, 131' an alternating current voltage proportional to $\psi$. The sum of these voltages is applied to the grids of the gas-discharge tubes 130, 130' in opposite senses, combined with the alternating voltages, $V_1$ $V_2$ produced by transformers 134, 134', 71, 71'.

The voltages $V_1$ are applied in the same sense to both grids and constitute a bias voltage. In order to supply this the primaries of the transformers 134, 134' are supplied from a source 72 providing alternating voltages in suitable phase relation to the source of power supplying the tubes 130, 130' through transformer 135.

The voltages $V_2$ are applied to the two grids in opposite senses and so act to unbalance the two tubes 130, 130' just as do the voltages across 131, 131'. They therefore act as control voltages in the same sense as those maintained across 131, 131'. It is by these voltages that I introduce the control terms characteristic of my invention.

Clearly the transformers 134, 134' need not be separate and the two voltages $V_1$, could be derived from separate windings in one transformer as is done in said Moseley et al. patent. Similarly transformers 71, 71' could be replaced by a single transformer with two separate secondaries. Also it is clear that the voltages $V_2$ could be applied to the grids of the tubes 130, 130' not in series with the transformers 134, 134', but in series with the resistances 131, 131'.

The tubes 130, 130' act as balanced rectifiers in the absence of any control voltage and the secondary windings 136, 136' of the power transformer 135 then send equal and opposite currents through the load circuit (as explained in said Moseley et al. patent).

The load circuit in the present case however does not consist only of a winding of motor 210 (preferably the power winding, the motor then being constantly excited from a separate source) but also of a resistance 73 in series with it.

Unbalancing of the tubes 130, 130' causes current to be passed through the load circuit 73, 210 in one direction or the other, this current having both alternating current and direct current components. Even if the motor 210 is a separately excited direct current motor, the alternating current voltage across it can be taken as a measure of the direct current voltage inclusive of resistance drop and back E. M. F., while the alternating current voltage across 73 may be taken as a measure of the armature current. These alternating current voltages are separated from the direct current voltages by transformers 74, 74', and filtered free from high frequency components as for example by the condenser-resistance filters 75, 76, 75', 76'. The condensers 77, 77' resistances 78, 78' and centre taps 79, 79' act as phase-shifting bridges of well known type for supplying the potentiometers 80, 80' with alternating voltages shifted in phase from those produced by transformers 74, 74' and filtered by the filters 75, 76, 75', 76' in the event of the phase of these voltages not being the best for acting as control voltages for the tubes 130, 130'.

The centre taps 79, 79' are joined by a connector 81, and the output connections 82, 82' of the potentiometers 80, 80' are used to feed the transformers 71, 71'. Consequently those are supplied with the sum of the two voltages tapped off potentiometers 80, 80'. $V_2$ therefore contains two components, one proportional to the current in resistance 73, i. e. the armature current $I_A$ of the motor 210 and the other proportional to the voltage $V_A$ across the armature.

It may be supposed that the mechanical constants of the following system driven by motor are known so that the torque required to impart to the system a known velocity $\dot{\phi}$ and acceleration $\ddot{\phi}$ is a known function of $\dot{\phi}$ and $\ddot{\phi}$. As a first approximation it may be supposed that the torque $T$ is composed of two terms, one $K\dot{\phi}$ required to maintain a velocity $\dot{\phi}$ against friction and the other $I\ddot{\phi}$ required to impart an acceleration $\ddot{\phi}$. In other words $$T = K\dot{\phi} + I\ddot{\phi}$$

The current $I_A$ taken by the azimuth motor is a measure of the torque. Consequently the armature current is proportional to the known function $I\ddot{\phi} + K\dot{\phi}$.

The armature voltage depends on the resistive drop, $RI_A$ and on the speed E. M. F. This voltage is therefore also a linear function of $\dot{\phi}$ and $\ddot{\phi}$, so that by combining the two voltages in suitable proportions and senses any desired linear combination of $\dot{\phi}$ and $\ddot{\phi}$ may be obtained.

I use such a combination of these two voltages as will make the whole control voltage applied to the discharge tubes approximate to $$(I-I')\ddot{\psi} + (K+K')\dot{\psi} + S\psi + I\ddot{\phi} + K\dot{\phi}$$

together with an additional term in $\dot{\phi}$ to compensate for the back E. M. F. of the motor.

Clearly there are many other methods of deriving velocity and acceleration terms and many other systems of amplification and control to which the invention is applicable.

In conclusion it may be stated that in its more general aspects the invention can be expressed as follows: It is supposed that there is a sending quantity $\theta$, and that a second quantity $\phi$ is to be controlled to be a predetermined function $f(\theta)$ of the sending quantity $\theta$. Setting means are provided to set the quantity $\phi$. The problem of the control system is to control these setting means continuously in the best manner possible in order that they will set the quantity $\phi$ to be as nearly as possible equal to $f(\theta)$ at all times, in spite of changes in $\theta$.

There will, in general, be an error $f(\theta) - \phi$ of the controlled quantity $\phi$, which error is known if $\theta$ and $\phi$ are known at the same instant. Automatic mean can therefore, in general, be devised to provide an indication of this error $f(\theta) - \phi$, or $\psi$, as it may be designated.

In order that the setting means should set the controlled quantity $\phi$, energy must be supplied, and the control system must control the rate of supply of this energy: in particular it must control the rate of supply so as to increase $\phi$ when $\phi$ is less than $f(\theta)$, and to decrease $\phi$ when $\phi$ is greater than $f(\theta)$.

Previous control systems controlled the rate of supply of energy in accordance with $f(\theta) - \phi$, or $\psi$, only or perhaps in accordance with $\psi$ and its derivatives $\dot{\psi}$ and $\ddot{\psi}$. The invention is based on the realisation that such control systems are inadequate. A method of analysis is laid down that is applicable to any such problem of control, which determines for the designer what control quantities he should use, thus enabling novel control systems to be designed and used.

In the general case, the setting means and the quantity $\phi$ set by them, together constitute a physical system, the quantity $\phi$ being set by some magnitude provided by the setting means, such as force, torque, E. M. F., current, or the like: this quantity may be broadly designated as "force"; its application to the system requires a supply of power to the setting means. This "force" may be denoted by $F$. The quantity $\phi$ will be set by the "force" $F$ in accordance with a governing law or equation of motion which is denoted by $F = g(\phi)$, and which will usually involve the derivatives $\dot{\phi}$, $\ddot{\phi}$ etc.

The problem of the control system is so to control $F$ that $\phi = f(\theta)$. According to the invention a control system is used such that $F$ is controlled from the sending quantity $\theta$ so as to be the function $$F = g\{f(\theta)\}$$

together, if necessary with any function of $\psi$ and its derivatives, say $h(\psi)$, that reduces to zero if $\psi$ and its derivatives are zero, i. e. so that $$F = g\{f(\theta)\} + h(\psi)$$

The governing law or equation of motion $F = g(\phi)$ then becomes $g\{f(\theta)\} + h(\psi) = g(\phi)$, which has as a possible solution the equation $\psi = 0$ (since this involves the equality of $f(\theta)$ and $\phi$).

The function $h(\psi)$ may be arbitrarily chosen so that the general solution of the equation $$g\{f(\theta)\} + h\psi = g(\phi)$$

is highly damped and had rapid periodicities.

In the above exposition the governing law $F = g(\phi)$ of the controlled physical system has been expressed in terms of a "force" or the like, $F$, because this is the form in which equations of motion or governing laws are usually expressed. However, such laws can be expressed directly in terms of the rate $P$ of supply of energy to the system. Thus the law $F = g(\phi)$ might equally well be expressed in the form $P = G(\phi)$ where $G(\phi)$ is a different function of $\phi$ from $g(\phi)$. The invention could then be described as controlling the rate of $P$ of supply of energy in accordance with the equation $$P = G\{f(\theta)\} + H(\psi)$$

This is exactly equivalent to the other form of expression.

In either form of expression the rate, $P$, of supply of energy, or the "force" $F$ will depend on the derivatives of $\theta$, since the equation of motion or governing law of the controlled system involves the derivatives of $\phi$. Accordingly the control system is characterised by the use of the first and/or higher derivatives of the sending quantity $\theta$.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What I claim is:

1. In a position control system, a controlling object, a controlled object and means for moving said controlled object substantially in positional agreement with said controlling object, comprising means for driving said controlled object, means for generating a signal E. M. F. in accordance with the positional disagreement of said controlled and controlling objects, means for generating a signal E. M. F. in accordance with the first and second time derivatives of the motion of said controlling object, means for generating a signal E. M. F. in accordance with the first and second time derivatives of the motion of said controlled object, means for combining said several E. M. F.'s and for controlling said driving means in accordance with said combined E. M. F.

2. A control system in accordance with claim 1 in which the driving means is a two phase motor having one phase excited by the signal E. M. F. and the other phase excited by a substantially constant alternating E. M. F.

3. A control system in accordance with claim 1 in which the driving means is a single phase compensated repulsion motor having a field winding and a compensating winding, one of said windings being excited by the signal E. M. F. and the other winding excited by a substantially constant alternating E. M. F.

4. In an electrical position control, a controlling object, a controlled object and means for moving said controlled object substantially in positional agreement with said controlling object, comprising a two-phase motor for driving said controlled object, means for generating a signal E. M. F. having components proportional to the positional disagreement of said controlled and controlling objects and to the first and second time derivatives of the motion of said controlling object, one phase of said motor being excited by a combined signal E. M. F. and the other phase being excited by a substantially constant alternating E. M. F.

5. In an electrical position control, a controlling object, a controlled object and means for moving said controlled object substantially in positional agreement with said controlling object, comprising a single phase compensated repulsion motor for driving said controlled object, means for generating a signal E. M. F. having components proportional to the positional disagreement of said controlled and controlling objects and to the first and second time derivatives of the motion of said controlling object, said repulsion motor having a field winding and a compensating winding, one of said windings being excited by a signal E. M. F. and the other winding being excited by a substantially constant alternating E. M. F.

6. In a position control system, a controlling object, a controlled object and means for moving said controlled object substantially in positional agreement with said controlling object, comprising means for driving said controlled object, means for generating an E. M. F. proportional to the relative displacement of said controlled and controlling objects, a generator driven by said controlled object for generating an E. M. F. proportional to the velocity of said controlled object, means for generating an E. M. F. which is a time derivative of said last E. M. F., and means for controlling said driving means jointly in accordance with said three E. M. F.'s.

7. In a position control system, a controlling object, a controlled object and means for moving said controlled object substantially in positional agreement with said controlling object, comprising means for driving said controlled object, means for generating an E. M. F. proportional to the relative displacement of said controlled and controlling objects, a generator driven by said controlled object for generating an E. M. F. proportional to the velocity of said controlled object, means for deriving from said last E. M. F. a further E. M. F. proportional to the time rate of change thereof and therefore proportional to the acceleration of said controlled object, and means for controlling said driving means jointly in accordance with said three E. M. F.'s.

8. In a position control system, a controlling object, a controlled object and means for moving said controlled object substantially in positional agreement with said controlling object, comprising means for driving said controlled object, means for generating an E. M. F. proportional to the relative displacement of said controlled and controlling objects, a generator driven by said controlled object for generating an E. M. F. proportional to the velocity of said controlled object, a circuit to which said last E. M. F. is applied, said circuit including reactance means for generating a further E. M. F. proportional to the time rate of change of said applied E. M. F. and therefore directly proportional to the acceleration of said controlled object, and means for controlling said driving means jointly in accordance with said three E. M. F.'s.

9. In a position control system, a controlling object, a controlled object and means for moving said controlled object substantially in positional agreement with said controlling object, comprising means for driving said controlled object, means for generating an E. M. F. proportional to the relative displacement of said controlled and controlling objects, a generator driven by said controlled object for generating an E. M. F. proportional to the velocity of said controlled object, means for deriving from said velocity E. M. F. a time derivative thereof, and means for jointly controlling said driving means in accordance with said displacement E. M. F. and said derivative E. M. F.

10. In a positional control system including a controlling object, a controlled object, driving means for said controlled object and means for controlling the operation of said driving means in accordance with the positional disagreement of said two objects, the combination of an electrical generator driven by said controlled object and a circuit for deriving a signal from the E. M. F. of said generator proportional to the time rate of change of said E. M. F., said signal being applied by circuit means to said driving means for further controlling the operation thereof.

11. In a positional control system including a controlling object, a controlled object, driving means for said controlled object and means for controlling the operation of said driving means in accordance with the positional disagreement of said two objects, a pair of generators driven by said controlling and controlled objects respectively for obtaining E. M. F.'s proportional to the respective velocities thereof, a differentiating circuit connected to each of said generators for deriving E. M. F.'s respectively proportional to the time rates of change of said velocity E. M. F's., said two derived E. M. F.'s being applied in opposition by circuit means to said driving means for further controlling the operation thereof.

12. Apparatus as claimed in claim 11, in which each of said differentiating circuits includes a reactance element for obtaining an E. M. F. proportional to the rate of change of current therethrough.

13. A positional control system comprising a controlling object, a controlled object, driving means for said controlled object, and means for obtaining a composite E. M. F. for actuating said driving means, said last means including means for obtaining an E. M. F. proportional to the positional disagreement of said two objects, an electrical generator driven by each of said two objects for obtaining E. M. F.'s proportional to the respective velocities of said objects, individual circuit means connected to each generator for deriving E. M. F.'s proportional to the respective rates of change of said velocity E. M. F.'s and therefore proportional to the respective accelerations of said two objects, and a circuit for combining said two acceleration E. M. F.'s and said positional E. M. F. to thereby obtain said composite E. M. F.

14. Apparatus as claimed in claim 13, in which said combining circuit is adapted to receive and to add to said composite E. M. F. said two E. M. F.'s proportional to the velocities of the two objects.

15. A positional control system comprising a controlling object, a controlled object, driving means for said controlled object, means for generating a signal E. M. F. proportional to the positional disagreement of said two objects, a pair of generators driven in positional agreement with said controlling and controlled objects respectively, means for obtaining from the output of each of said generators two signal E. M. F.'s, proportional respectively to the generated voltage and to the rate of change of said voltage, means for combining said several signal E. M. F.'s and means for controlling the operation of said driving means in accordance with the combination thereof.

ROBERT HAYES NISBET.

Certificate of Correction

Patent No. 2,414,430.                                                  January 14, 1947.

ROBERT HAYES NISBET

It is hereby certified that errors appear in the printed specification of the above numbered patent requiring correction as follows: Column 1, line 41, for "$\phi = \theta$" read $\phi = \theta$; column 5, line 46, for "accodance" read *accordance*; column 14, line 17, for "lag $\psi$" read *lag* $\psi$; column 16, line 55, for "had" read *has*; and that the said Letters Patent should be read with these corrections therein that the same may conform to the record of the case in the Patent Office.

Signed and sealed this 22d day of July, A. D. 1947.

[SEAL]

LESLIE FRAZER,
*First Assistant Commissioner of Patents.*